United States Patent [19]

Fujimoto

[11] Patent Number: 4,987,980
[45] Date of Patent: Jan. 29, 1991

[54] LOCK-UP DAMPER DEVICE FOR TORQUE CONVERTER

[75] Inventor: Shinji Fujimoto, Neyagawa, Japan

[73] Assignee: Kabushiki Kaisha Daikin Seisakusho, Osaka, Japan

[21] Appl. No.: 541,175

[22] Filed: Jun. 20, 1990

Related U.S. Application Data

[63] Continuation of Ser. No. 362,425, filed as PCT JP88/00806 on Aug. 13, 1988, published as WO89/02551 on Mar. 23, 1989, abandoned.

[30] Foreign Application Priority Data

Sep. 11, 1987 [JP] Japan .................. 62-229176
Sep. 11, 1987 [JP] Japan ................ 62-139674[U]

[51] Int. Cl.⁵ .................. F16H 45/02; F16D 3/12
[52] U.S. Cl. ..................... 192/3.28; 192/3.29; 192/106.2; 464/63; 464/64
[58] Field of Search ................ 192/3.28, 3.29, 3.3, 192/30 V, 106.1, 106.2; 464/63, 64, 66, 67

[56] References Cited

U.S. PATENT DOCUMENTS

| | | | |
|---|---|---|---|
| 4,138,003 | 2/1979 | Malloy | 192/3.29 |
| 4,347,717 | 9/1982 | Lamarche | 464/64 |
| 4,559,024 | 12/1985 | Tamura et al. | 464/63 |
| 4,668,207 | 5/1987 | Koshimo | 464/63 |
| 4,693,348 | 9/1987 | Tsukamoto et al. | 192/3.29 |
| 4,694,941 | 9/1987 | Hall et al. | 192/3.28 |

FOREIGN PATENT DOCUMENTS 56-94049 7/1981 Japan .
57-195957 12/1982 Japan .
63-75655 5/1988 Japan .

*Primary Examiner*—Richard Lorence
*Attorney, Agent, or Firm*—Armstrong, Nikaido, Marmelstein, Kubovcik & Murray

[57] ABSTRACT

A lock-up damper for a torque converter disposed between a front cover and a torque converter and having a piston with a friction member thereon, a first retaining plate secured to the piston and a side plate and second retaining plate secured to each other and to the piston by a common securing means. The first retaining plate holding outer torsion springs and the side plate and second retaining plate holding inner torsion springs and a driven plate between the piston and the torque converter and secured at its inner peripheral end to a hub of a turbine, the driven plate having a plurality of projections of progressively engaging the inner and outer torsion springs.

5 Claims, 8 Drawing Sheets

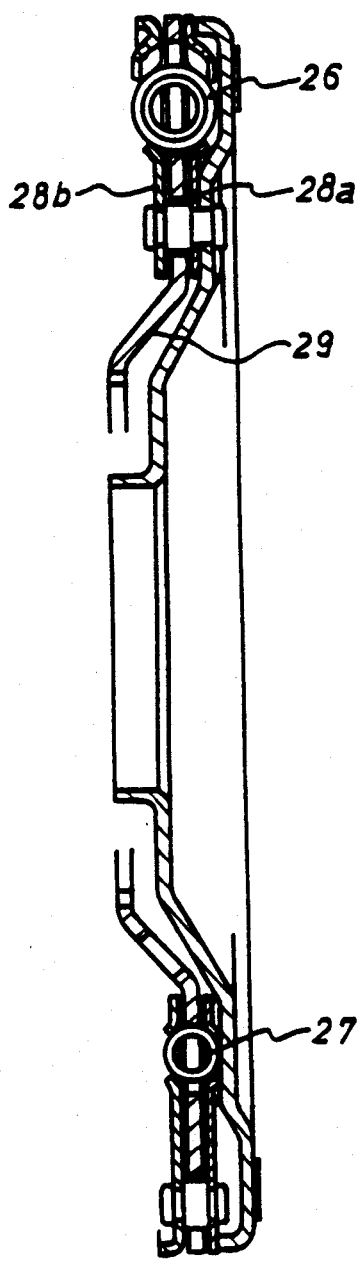
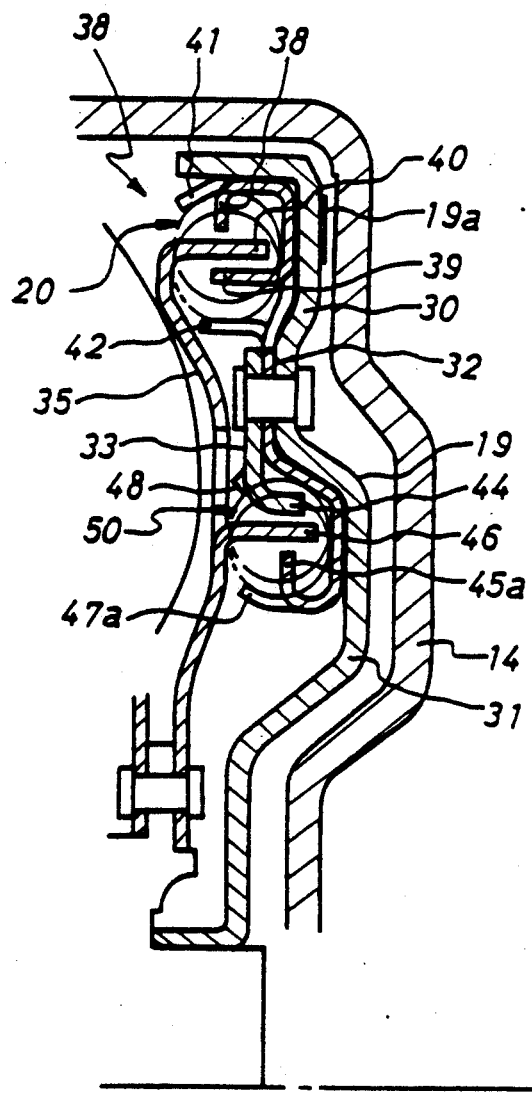

LOCK-UP DAMPER DEVICE FOR TORQUE CONVERTER

This application is a continuation of application Ser. No. 362,425, filed as PCT JP88/00806 on Aug. 13, 1988, published as WO89/02551 on Mar. 23, 1989 now abandoned.

DESCRIPTION

1. Technical Field present invention relates to a lock-up damper device disposed between a piston having a friction facing (clutch plate) of a lock-up clutch and a turbine of a torque converter. While the lock-up clutch is in lock-up operating condition, the damper device prevents torsional vibration generated in the engine from being transmitted to the transmission shaft.

2. Background of the Invention (Prior art)

In FIG. 4, illustrating Japanese Utility Model Application No. 61-170593, filed June 11, 1986, corresponding U.S. application S.N. 210,043, filed June 2, 1988 and now U.S. Pat. No. 4,903,803, torque converter 10 comprises a pump 11, a turbine 12 and a stator 13 etc.. The pump 11 is welded to a front cover 14 connected at a center portion thereof to a crank shaft, or input shaft, 15. The turbine 12 is connected to an output shaft 17 by means of an internally splined hub 16. The output shaft 17 is connected to a transmission.

A lock-up damper 18 is disposed between the turbine 12 and the front cover 14. Power from the front cover 14 is transmitted directly to the hub 16 through the lock-up damper 18.

The lock-up damper 18 consists of a piston 19 which is movable in the axial direction of the torque converter, a retaining plate 22 fixed on the piston 19, a driven plate fixed on the hub 16 and a plurality of torsion springs 20.

However, the characteristics of torsional angle and transmission torque of the lock-up damper of FIG. 4 are limited to a narrow range by the torsion springs 20 disposed on the outer portion, or the torsion springs 23, shown in FIG. 5, disposed on the inner portion.

Moreover, as shown in FIGS. 5 and 6, in the case where the torsion springs 26 and torsion springs 27 are disposed at both the outer portion and the inner portion, the two driven plates (the side plate 24a and retaining plate 24b in FIG. 5, the side plates 28a, 28b in FIG. 6) and one driven plate (plate 25 in FIG. 5, plate 29 in FIG. 6) are overlapped. Therefore the damper is a complicated structure and the cost is expensive.

(Object of the Invention)

One object of the invention is to obtain a wide range of characteristics of torsional angle-transmission torque.

Another object is to obtain a simple structure for holding both torsion springs and to reduce cost.

(Structure of the Invention)

In order to attain the above objectives in this invention, a friction facing is movable axially and engagable with a front cover by friction and disposed between the turbine of the torque converter and the front cover.

The friction facing is connected to the turbine so as to allow relative rotation through a plurality of outer and inner torsion springs.

The friction facing, a retaining plate and a side plate are secured on a piston and a plurality of outer holders for holding the outer torsion springs are formed on the retaining plate.

A plurality of inner holders for holding the inner torsion springs are formed on both the retaining plate and the plate.

A driven plate is disposed along an edge of the front cover and absorbably connects both torsion springs to a turbine-hub.

The turbine-hub is connected to an output shaft.

BRIEF DESCRIPTION OF THE INVENTION

FIG. 1 is a vertical sectional view of a lock-up damper according to this invention.

FIG. 2 a partial plan view of the piston assembly, partly in section, as viewed from the left in FIG. 1.

FIGS. 5 and 6 are vertical sectional views of other prior art arrangements.

FIG. 7 is a vertical sectional view of another embodiment of the invention.

BEST MODE FOR CARRYING OUT THE INVENTION (Embodiment 1)

Figure 1:
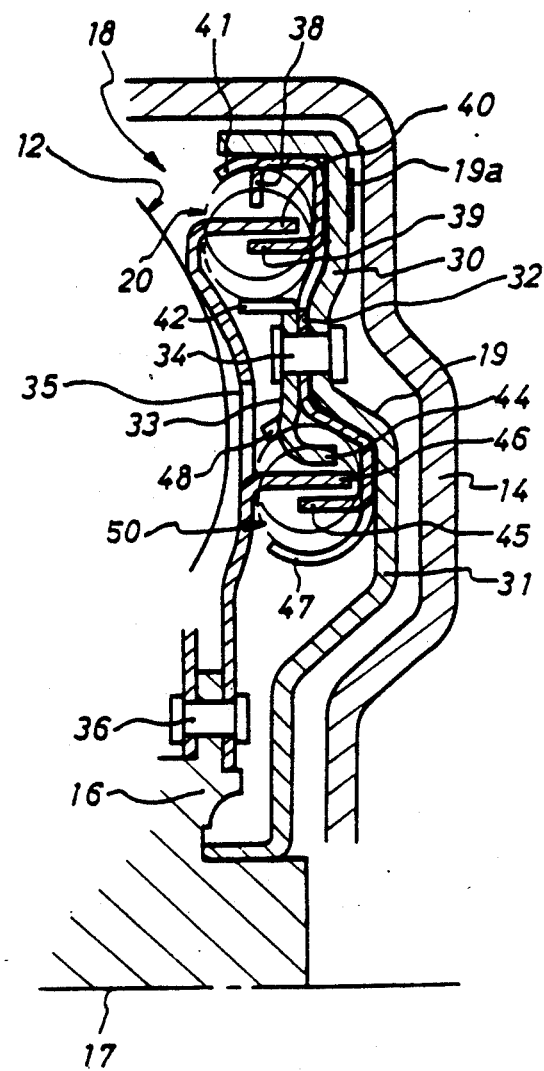
Figure 4:
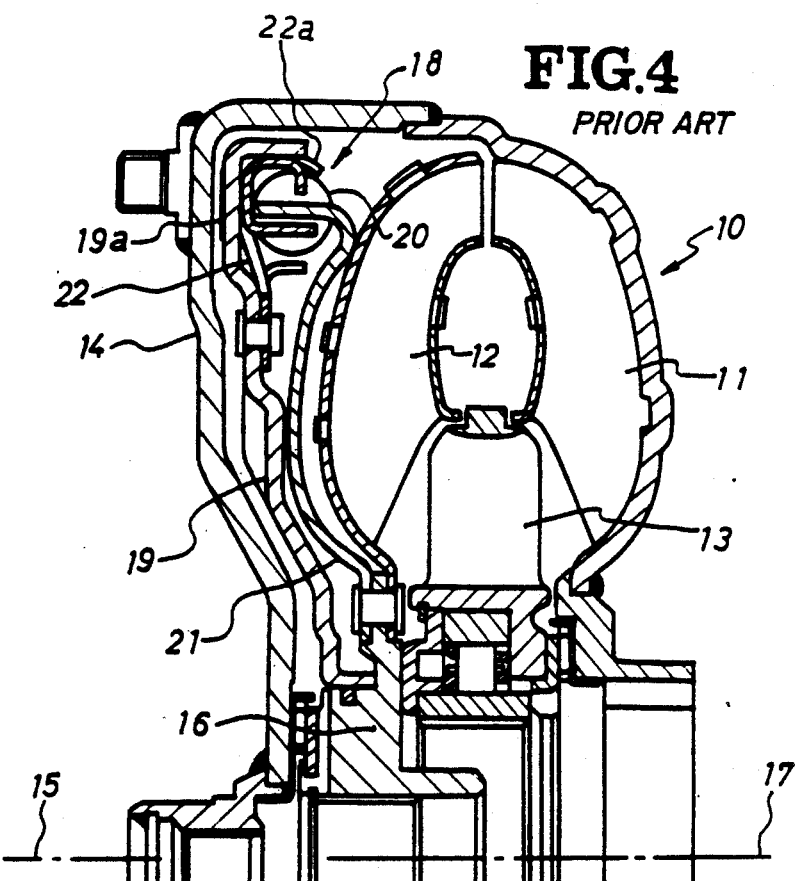
FIG. 4 is a vertical sectional view of a prior art arrangement.
Figure 5:
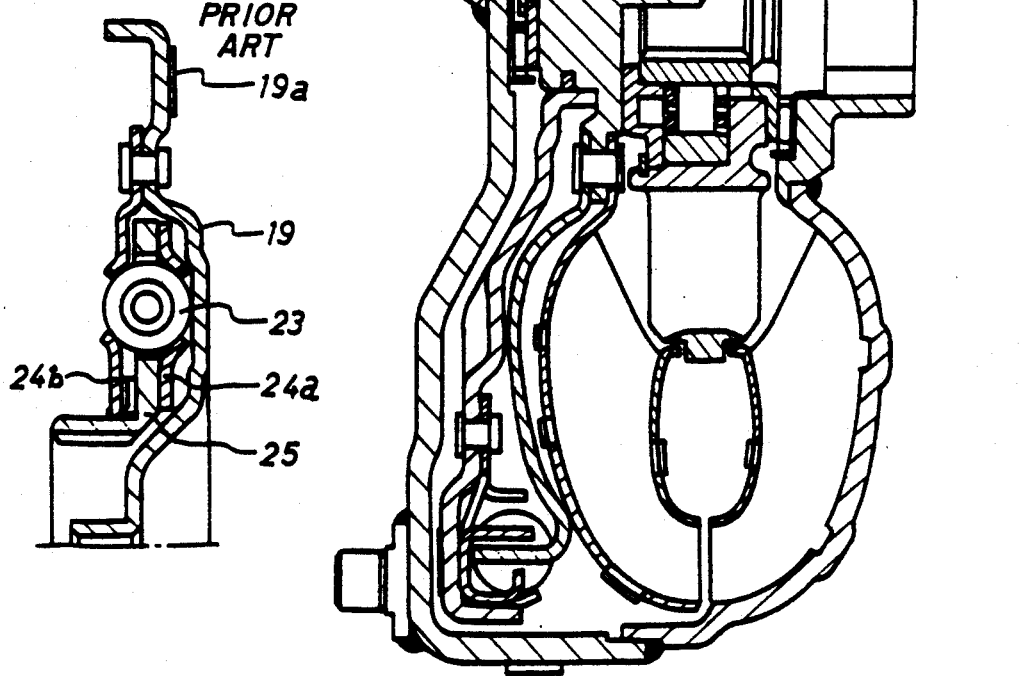

FIG. 1 shows the lock-up damper according to the present invention, like parts are designated by like numerals used in FIG. 4. In FIG. 1, a projection 30, accommodating a plurality of torsion springs 20, is formed on the outer peripheral portion of piston 19. A projection 31, accommodating a plurality of torsion springs 50, is formed on the inner peripheral portion of piston 19. A retaining plate 32 and a side plate 33 are fastened together on the left-end face of the piston 19 by means of a plurality of rivets 34. The retaining plate 32 and the side plate 33a, respectively, hold a plurality of torsion springs 20, 50. Power from the piston 19 is transmitted to the torsion springs 20, 50. A driven plate 35 is fixed to the hub 16 by rivets 36. The driven plate 35 transmits power from the torsion springs 20, 50 to the hub 16.

Figure 2A:
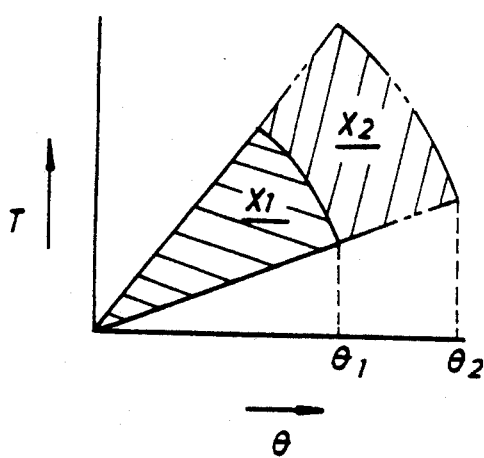
FIG. 2a is a graph of the torsional characteristic of the lock-up damper of the invention.
Figure 2:
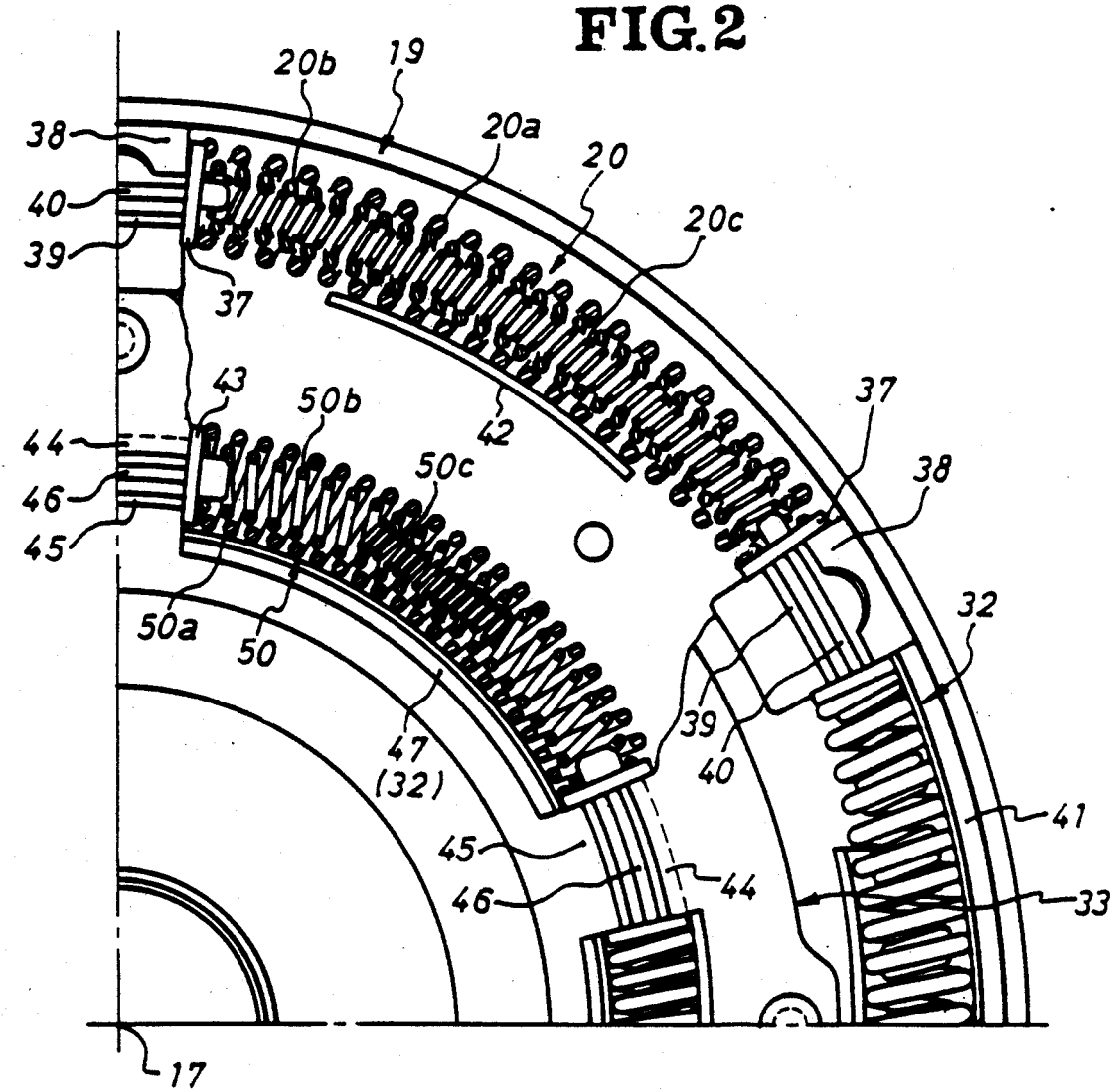

Each outer torsion spring 20, FIG. 2, consists of three coil springs 20a, 20b and 20c all at the same center. The opposite ends of the torsion spring 20 contact with the spring seats 37. Projections 38, 39, FIG. 1, are formed on retaining plate 32 by cutting and rising (bending) and are in contact with the spring seats 37, FIG. 2.

Each projection 38 extends from outside, FIG. 1, toward the center of the spring seat 37. Each projection 39 extends from right side of FIG. 1 toward the center of the spring seat 37, FIG. 2. A plurality of projections 40, FIG. 1, are formed on the driven plate 35 by cutting and rising. Each projection 40 is disposed between the projections 38 and 39.

Projections 38 extend in parallel with the axial direction of piston 19 and are located on the inner peripheral portions of the torsion springs. Projections 39 extend toward the center of the clutch and are located on the outer peripheral portions of the torsion springs.

Twin holders 41, 42 hold the torsion spring 20 at outer peripheral and inner peripheral ends and are formed on retaining plate 32. The holders 41, 42 extend in the axial direction to surround the outer and inner sides of the torsion spring 20. As shown in FIG. 2, the holders 41, 42 are arched shape.

As described above, the torsion springs 20 are disposed between the retaining plate 32 and the driven plate 35 so as to expand and contract in the circumferential direction. This lock-up damper 18 has six torsion springs 20 disposed at equal spaces in the circumferential direction.

The detailed structure of the retaining plate 32 holding the torsion springs 20 and the driven plate 35 are described in the Japanese Utility Model Application No. 61-170593.

Each inner torsion spring 50 consists of three coil springs 50a, 50b, 50c all at the same center. The lock-up damper has five inner torsion springs 50 disposed at equal spaces in the circumferential direction. The coil springs 50a, 50b are long and act at and from the first stage of small torsional angle. The coil spring 50c is short and acts at second stage of large torsional angle.

The opposite ends of the torsion springs 50 contact the spring seats 43. Projections 44, 45, 46 of the side plate 33, the retaining plate 32 and the driven plate 35, respectively, are in contact with the spring seats 43. The projections 44, 45, 46 are formed by cutting and rising.

The projections 44 corresponding to the projection of the side plate 33 which extends in parallel with the axial direction and are located on the outer peripheral portion of the torsion springs. The projections 45 are corresponding to the projection of retaining plate 32 which extends in parallel with the axial direction and are located o the inner peripheral portion of the inner torsion springs.

Arched holders 47 which hold the torsion springs 50 at the inner peripheral side and are formed on the retaining plate 32. Projections 48, which hold the torsion springs 50 at the outer peripheral side, are formed on the side plate 33 by cutting and rising. The projections 48 are shaped like as eaves. The lock-up damper 18 has a plurality of projections 48 and a plurality of holders 47.

Function will be described hereunder. Relating to the torsion springs 20, the power from the engine, which is transmitted from the facings 19a of the piston 19, retaining plate 32, projections 38, 39, torsion springs 20, projections 40 and the driven plate 35, is transmitted to the output shaft 17.

Relating to the torsion springs 50, the power transmitted from the engine, which is transmitted from facings 19a of piston 19, retaining plate and side plate 32 and 33, projections 44, 45, torsion springs 50, projection 46 and the driven plate 35, is transmitted to the output shaft 17.

During small angle of the torsion, coil springs 20a, 20b, 20c of the torsion springs 20 and the coil springs 50a, 50b of the torsion springs 50 operate, that is, are compressed. During large angle of the torsion, the coil spring 50c in addition to above five springs 20a, 20b, 20c, 50a and 50c operates, that is, is also compressed.

Therefore, the range of torsional characteristics in the case of this invention is wider than the range of torsional characteristics in the case of conventional device equipped with torsion springs 20 or torsion springs 50.

(Embodiment 2)

Figure 9:
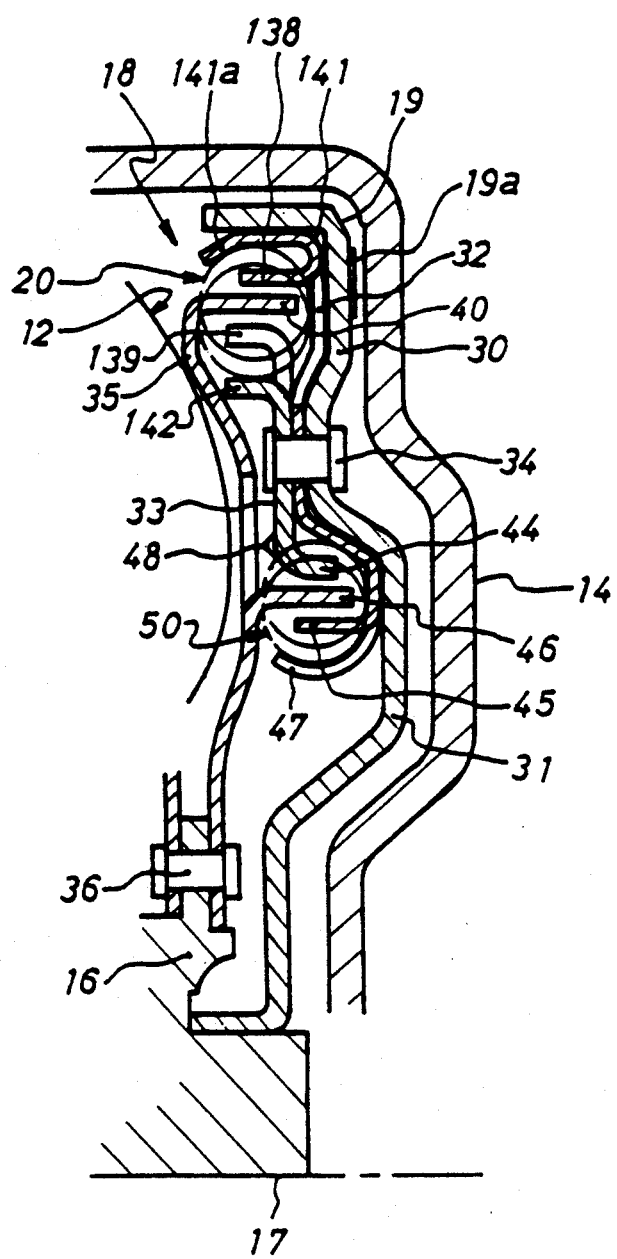
FIG. 9 is a vertical sectional view of another embodiment.
Figure 10:
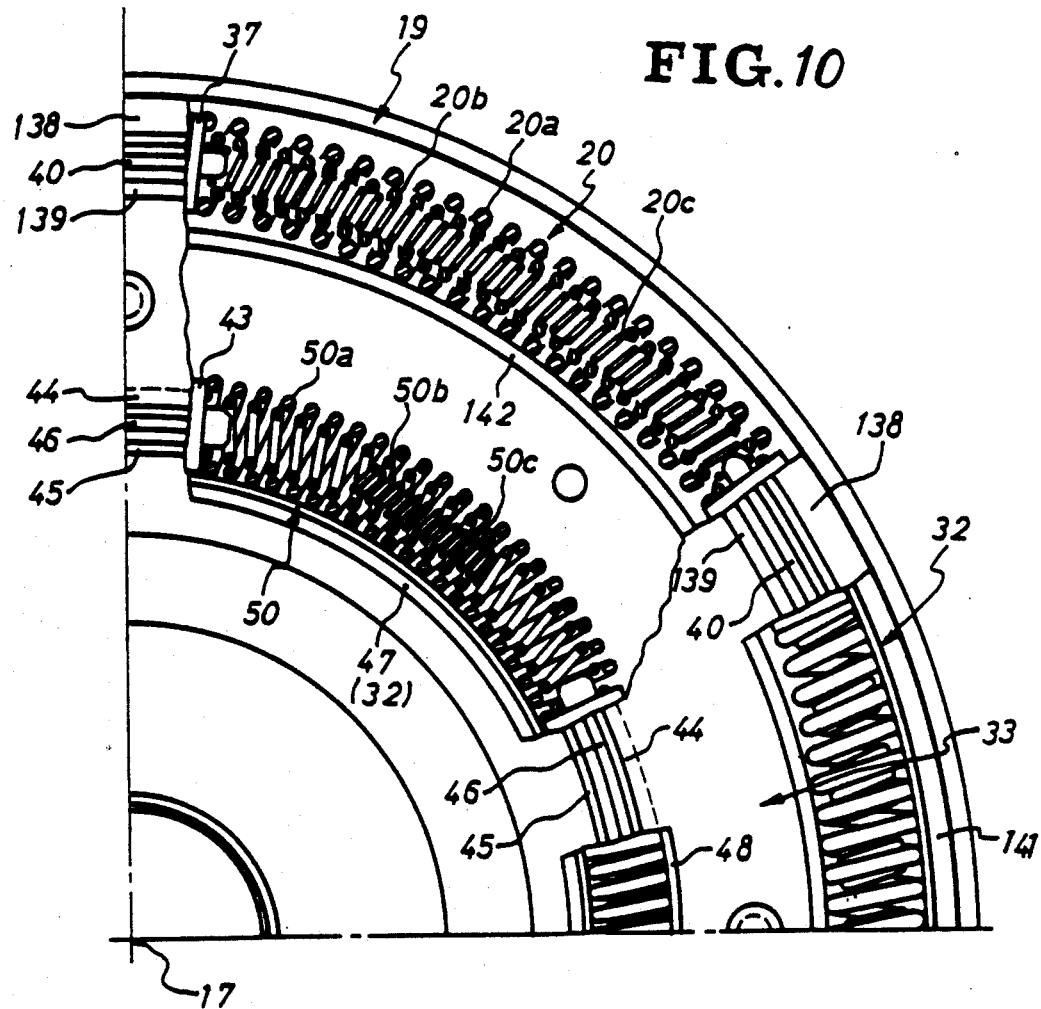
FIG. 10 is a partial plan view, partly in section, of the embodiment of FIG. 9.

FIGS. 9 and 10 show the second embodiment of the present invention, like parts being designated with like numerals. Each outer torsion spring 20, as shown in FIG. 10 consists of three coil springs 20a, 20b and 20c all at the same center. The opposite ends of the torsion springs 20 are in contact with spring seats 37. Projections 138, of which there are three, extend horizontally from the right side toward the left side of FIG. 9. The projection 139 extend upward from the upper end of the side plate 33 and bent in the shape of an L. Each projection 40 is disposed between the projections 138 and 139 and is formed by cutting and rising on the driven plate 35.

A cylindrical holder 141 to hold the torsion springs 20 at the outer peripheral side is formed on the retaining plate 32. The holder 141 extends in the circumferential direction and forms a circle. The end 141a of the holder 141 is curved so as to retain the torsion springs 20 at its side. Projections 138 are formed on the retaining plate 32 by cutting and rising are disposed at the inner side from the holder 141.

The inner peripheral sides of the torsion springs 20 are held by holders 142 formed in the shapes of an L on the upper end of the side plate 33 by cutting and rising.

Each torsion spring 20 is disposed between the retaining plate 32 and the driven plate 35 so as to expand and contract in the circumferential direction. This lock-up damper 18 has six torsion springs 20 disposed at equal spaces in the circumferential direction of the damper.

Each inner torsion spring 50, as shown in FIG. 10, consists of three coil springs 50a, 50b, 50c all on the same center. The lock-up damper has five inner torsion springs 50 disposed at equal spaces in the circumferential direction of the damper. The coil springs 50a, 50b are long and act at and from the first stage of small torsional angle. The coil spring 50c acts at second stage of large torsional angle.

The opposite ends of the torsion springs 50 are contacted with the spring seats 43. Projections 44, 45, 56 of the side plate 33, the retaining plate 32 and the driven plate 35, respectively, are contact with the seats 43 and are formed by cutting and rising.

Arched holders 47, holding the torsion springs 50 at the inner peripheral side of the springs are formed on the retaining plate 32. Projections 48 pushing at the outside of the torsion springs 50 are formed on the side plate 33 by cutting and rising and are shaped like as eaves.

In the above second embodiment, when the lock-up damper rotates at high speed, though a centrifugal power applies in the torsion springs 20, the continued cylindrical holder 141 holds the outside of the torsion springs 20. Therefore the strength of the holder 141 is high.

In the conventional device, as shown in FIG. 4, because the holders 22a of the retaining plate 22 are formed by cutting and rising, the outer portion of the retaining plate 32 can be cracked.

In the case of the second embodiment, the strength of the holder 141, holding the outside of the torsion springs 20, becomes have high against the centrifugal force because the holder 141 is continuously formed in cylindrical shape on the circumferential direction. Therefore, the strength of burst-resistance is improved as compared with the conventional device having cutting lines.

In the case that the centrifugal force of the torsion springs 20 acts directly on the holder 141, the cylindrical holder 141 can hold the outer peripheral sides of the torsion springs 20. Namely, burst-resistance is improved by improving the strength of the holder 141.

The structure of the lock-up damper is simplified and the cost is reduced in the case of torsion springs 20 and 50, because the holders 141-48 are separated onto the retaining plate 32 and the side plate 33.

The structure of the retaining plate 32 is simplified because the holders 142, holding the outer torsion springs 20 at the inside, are formed on the side plate 33.

The structure of the retaining plate 32 is simplified and the process of manufacturing is reduced. Moreover, the cost of the materials becomes lower because the holders 142, holding the outer torsion springs 20 from the inside, are formed on the side plate 33.

(Other Embodiment)

Figure 3:
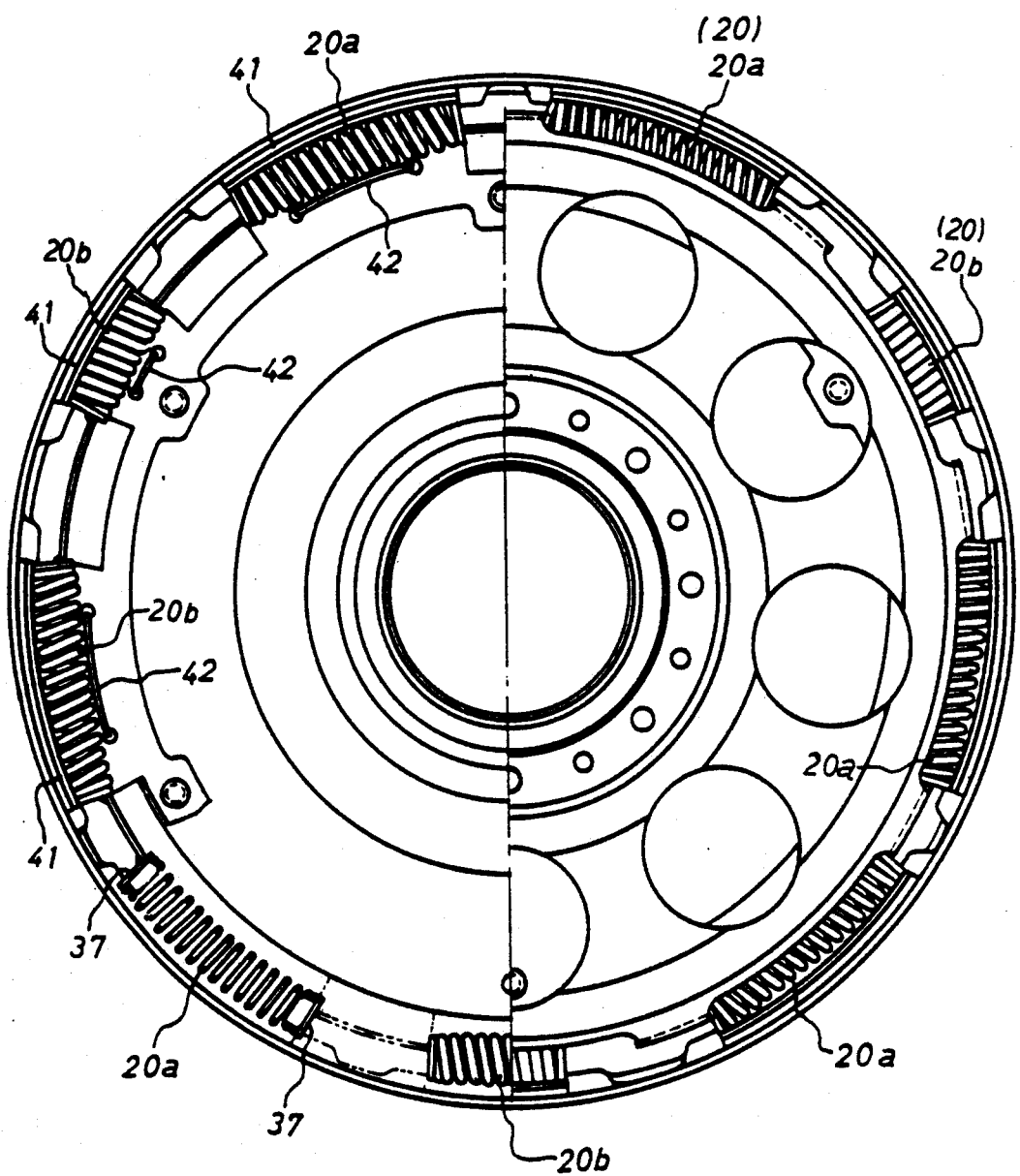
FIG. 3 is a plan view of another embodiment of the present invention.

(1) The embodiment of the present invention is not limited to the tow embodiments described. As shown in FIG. 3, outer spring 20 can comprise a long coil spring 20a and a short coil spring 20b.

(2) The present invention is not limited to the foregoing two embodiments. Three springs may be disposed on each of the differential centers; springs 20 may be disposed on more or less places than six locations; and springs 50 may be disposed on more or less places than five locations. Moreover, springs 20 or 50 may be unequally circumferentially spaced.

Figure 8:
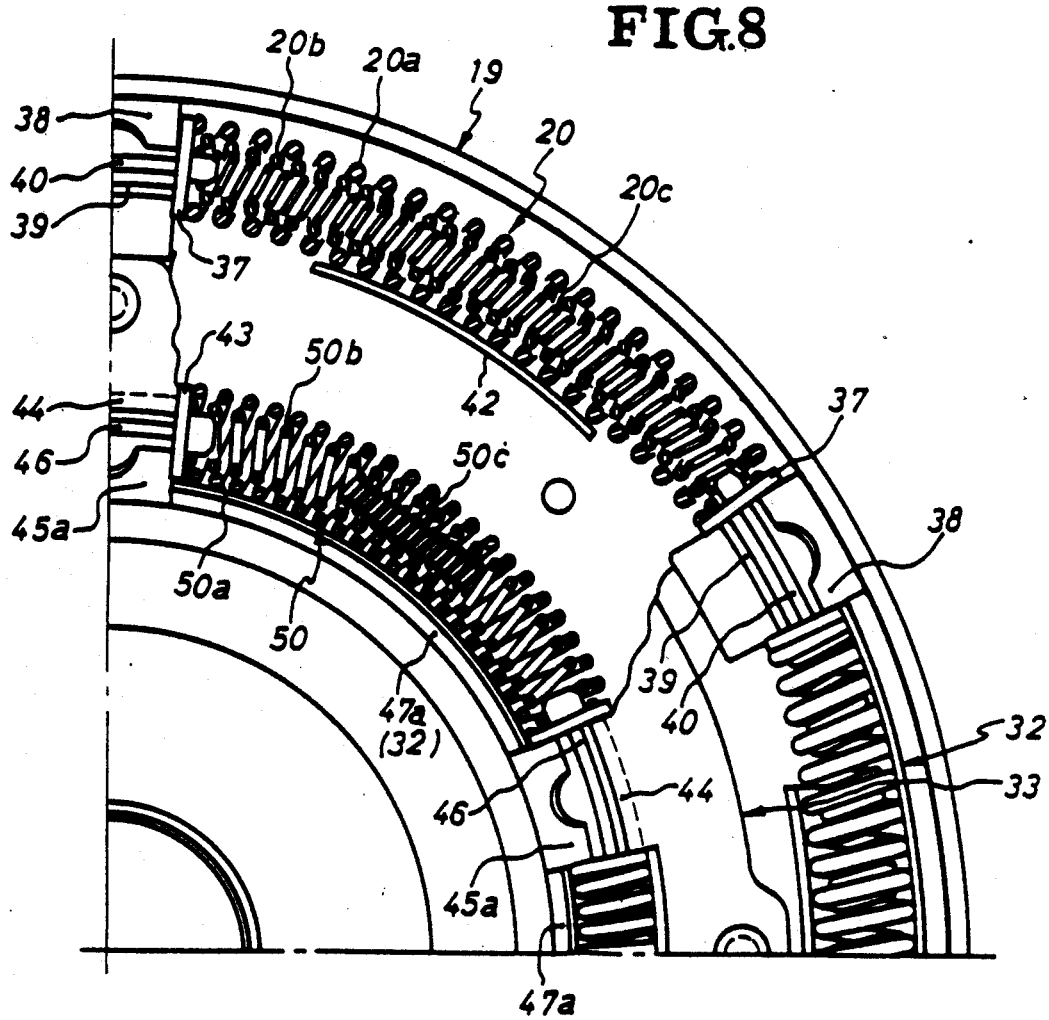
FIG. 8 is partial plan view, partly in section, of the embodiment of FIG. 7.

(3) It is possible to form projections 45 of the retaining plate and the holders 47 into the figures of projections 45a, holders 47a, FIGS. 7 and 8.

Namely, in this embodiment, the holders 47a holding the inner sides of torsion springs 20 continue to the projections and extend to the inside of the torsion springs 50.

The projections 45 part from the holders 47a, at the inside of the torsion springs 50, and extend radically outward, by cutting and rising, to be in contact with the spring seats 43.

(Effective of the Invention)

Compared with the conventional lock-up damper provided with anyone of the torsion springs 20 or the torsion springs 23, the torsional characteristic of the present invention is larger, by the area X2 of FIG. 2 from the area X1 of the conventional device, and permits a large range accommodating various conditions requested because, in the present invention, the power from piston 19 is absorbed by the both outer and inner springs 20 and 50.

The structure of the damper is simplified and the cost price is reduced because the torsion springs 20 are held by the holders 41 and 42 of the retaining plate 32 and the torsion springs 50 is held by the projections 48 of the retaining plate 32 and the holders 47 of the side plate 33.

What is claimed is:

1. A lock-up damper device for a torque converter having a front cover, an output shaft and a turbine having a turbine hub mounted on said output shaft, said damper device comprising a piston mounted axially movable and circumferentially movable through a limited angle of rotation on said turbine hub and disposed axially between said turbine and said front cover, a friction facing on said piston for engagement with said front cover when said piston is moved axially on said turbine hub toward said front cover, a driven plate positioned axially between said turbine and said piston, said driven plate having a radial inner end and being fixed adjacent said radial inner end to said turbine hub, a retainer plate and a side plate disposed axially intermediate said piston and said driven plate and secured to each other and to said piston by a common securing means, said retainer plate and said side plate having a plurality of circumferentially spaced outer torsion spring holders formed thereon, said retainer plate and said side plate having a plurality of circumferentially spaced inner torsion spring holders formed thereon, a plurality of outer and inner torsion springs mounted on said retainer plate and said side plate in said outer torsion spring holders and said inner torsion spring holders, respectively, and a plurality of projections on said driven plate, said retaining plate and said side plate, said projections engaging opposite ends of said inner and outer torsion springs, said springs being progressively compressed when said friction facing on said piston is engaged with said cover and transmitting torque from said piston to said turbine when said friction facing is engaged with said cover and allowing said limited relative rotation between said piston and said turbine.

2. A lock-up damper for a torque converter as set forth in claim 1, in which said plurality of projections on said driven plate are formed by cutting and raising, said projections extend in the axial direction of said torque converter for engaging and compressing said torsion springs.

3. A lock-up camper for a torque converter as set forth in claim 1, in which said projections on said retaining plate are formed by cutting and rising, one set of projections being disposed at an inside portion of said outer torsion springs and extending in the axial direction of said torque converter for compressing said outer torsion springs, another set of projections being disposed at an outside portion of said outer torsion springs and extending radially inward, and a third set of projections being disposed at an inside portion of said inner torsion springs and extending in said axial direction for compressing said inner torsion springs.

4. A lock-up damper for a torque converter as set forth in claim 1, in which said projections on said side plate are formed by cutting and rising, said projections being disposed at an outside portion of said inner torsion springs and extending in said axial direction for compressing said inner torsion springs.

5. A lock-up camper for a torque converter as set forth in claim 1, in which a short spring is inserted in one of said inner torsion springs and said outer torsion springs, said short spring acting in a high range of torsional angle, the remaining torsion springs in said one of said inner and outer torsion springs acting in all ranges of torsional angle.

* * * * *